(12) United States Patent
Hayashi et al.

(10) Patent No.: US 9,955,433 B2
(45) Date of Patent: Apr. 24, 2018

(54) WIRELESS COMMUNICATION APPARATUS, WIRELESS COMMUNICATION METHOD, PROGRAM, AND INTEGRATED CIRCUIT

(71) Applicant: SHARP KABUSHIKI KAISHA, Osaka-shi, Osaka (JP)

(72) Inventors: Takashi Hayashi, Osaka (JP); Hiroki Takahashi, Osaka (JP); Jungo Goto, Osaka (JP); Osamu Nakamura, Osaka (JP); Kazunari Yokomakura, Osaka (JP); Yasuhiro Hamaguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 183 days.

(21) Appl. No.: 14/421,341

(22) PCT Filed: Aug. 1, 2013

(86) PCT No.: PCT/JP2013/070854
§ 371 (c)(1),
(2) Date: Feb. 12, 2015

(87) PCT Pub. No.: WO2014/027573
PCT Pub. Date: Feb. 20, 2014

(65) Prior Publication Data
US 2015/0223177 A1 Aug. 6, 2015

(30) Foreign Application Priority Data
Aug. 13, 2012 (JP) .................................. 2012-179241

(51) Int. Cl.
*H04W 4/00* (2009.01)
*H04W 52/24* (2009.01)
(Continued)

(52) U.S. Cl.
CPC .......... *H04W 52/242* (2013.01); *H04L 5/0007* (2013.01); *H04W 52/246* (2013.01); *H04W 52/34* (2013.01); *H04W 52/146* (2013.01)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS

2009/0117931 A1* 5/2009 Shin .................... H04W 52/146
455/522
2012/0165029 A1* 6/2012 Lindbom ................ H04L 5/00
455/450
(Continued)

FOREIGN PATENT DOCUMENTS

WO WO 2011050921 A1 * 5/2011 ........... H04L 5/0007
WO WO 2011/162156 A1 12/2011

OTHER PUBLICATIONS

U.S. Appl. No. 61/539,701 Provisional Specification.*
(Continued)

*Primary Examiner* — Siren Wei
(74) *Attorney, Agent, or Firm* — Birch, Stewart, Kolasch & Birch, LLP

(57) ABSTRACT

In a case where transmission power control is performed for a plurality of CCs in CA, information transmitted between a transmitter and a receiver in terms of the transmission power control is reduced. A wireless communication apparatus according to the present invention is a wireless communication apparatus configured to perform communication using at least two or more types of component carriers, including transmission power control units 106-1 to 106-3 configured to select one calculation formula from a plurality of different calculation formulas depending on a type of the component carrier and calculate transmission power of the (Continued)

component carrier, and an RF unit 107 configured to perform communication using the component carrier based on the calculated transmission power.

4 Claims, 8 Drawing Sheets

(51) Int. Cl.
*H04W 52/34* (2009.01)
*H04L 5/00* (2006.01)
*H04W 52/14* (2009.01)

(56) References Cited

U.S. PATENT DOCUMENTS

| | | | |
|---|---|---|---|
| 2012/0202554 A1* | 8/2012 | Seo | H04W 52/146 455/522 |
| 2012/0320874 A1* | 12/2012 | Li | H04W 48/12 370/331 |
| 2013/0077571 A1* | 3/2013 | Papasakellariou | H04W 52/325 370/328 |
| 2013/0100842 A1 | 4/2013 | Nishikawa et al. | |

OTHER PUBLICATIONS

Nokia Siemens Networks et al., "Fractional power control setting in relay deployment," 3GPP TSG RAN WG1 #59bis Meeting, Valencia, Spain, Jan. 18-22, 2010, R1-100355, 3 pages.
3GPP, "3rd Generation Partnership Project; Technical Specification Group Radio Access Network; Evolved Universal Terrestrial Radio Access (E-UTRA); Physical layer procedures (Release 10)", 3GPP TS 36.213, V10.5.0, Mar. 2013, pp. 1-125.
CATR, "Discussion of power Scaling Method for UL PC", 3GPP TSG-RAN WG1 #62bis, R1-105641, Oct. 11-15, 2010, pp. 1-4.
Nokia Siemens Networks, Nokia Corporation, "Remaining issues on uplink power control", 3GPP TSG RAN WG1 #61bis Meeting, R1-103792, Jun. 28-Jul. 2, 2010, pp. 1-7.
Editor (Motorola Mobility), "Introduction of Rel-11 features", 3GPP TSG-RAN WG1 Meeting#70, R1-123796, Qingdao, China, Aug. 13-17, 2012, XP050661649.
Sharp, TPC accumulation for multiple TA and Text Proposal, 3GPP TSG RAN WG1 Meeting #70, R1-123259, Qingdao, China, Aug. 13-17, 2012, XP050661149.

* cited by examiner

WIRELESS COMMUNICATION APPARATUS, WIRELESS COMMUNICATION METHOD, PROGRAM, AND INTEGRATED CIRCUIT

TECHNICAL FIELD

The present invention relates to a wireless communication apparatus, a wireless communication method, a program, and an integrated circuit.

BACKGROUND ART

Transmit power control (TPC) is a technique used in uplinks to control transmission power by a mobile station such that intercell interference is reduced to a minimum necessary level while maintaining necessary quality in communication with a base station by controlling transmission power. In a 4-th generation mobile communication system called an LTE (Long Term Evolution)-Advanced system or the like whose standard is being established by 3GPP (The Third Generation Partnership Project), a technique called carrier aggregation (hereinafter referred to as CA) is employed to realize a wide band greater than 20 MHz. In the CA technique, one system band that supports LTE Rel. 8 is used as a component carrier (hereinafter referred to as CC), and communication is performed by simultaneously using a plurality of CCs. CA in an uplink is explained below for a case where transmission power is controlled independently for each of a plurality of CCs.

FIG. 8 is a block diagram of a transmission apparatus of a mobile station that performs transmission to a base station by using three CCs. Note that for simplicity of illustration, only blocks necessary in describing the background art are shown.

Each independent information data to be transmitted by each one of CCs is subjected to error correction encoding performed by respective encoders 1-1 to 1-3, and further subjected to a modulation process such as QPSK (Quaternary Phase Shift Keying), 16QAM (16-ary Quadrature Amplitude Modulation) or the like by modulation units 2-1 to 2-3. The modulated signals are respectively subjected to DFT (Discrete Fourier Transform, also called DFT Pre-Coding) performed by respective DFT units 3-1 to 3-3 thereby being converted into frequency-domain signals and then allocated to resource blocks (which are minimum units each including one or more subcarriers used by a mobile station in accessing a base station and which hereinafter will be referred to as RBs) to be used by resource mapping units 4-1 to 4-3.

In a case where RBs allocated by the resource mapping units 4-1 to 4-3 are contiguous, OFDM (Orthogonal Frequency Division Multiplexing) signal generation units 5-1 to 5-3 generate contiguous DFT-S-OFDM (Discrete Fourier Transform Spread Orthogonal Frequency Division Multiplexing) signals. However, in a case where the RBs allocated are not contiguous, clustered DFT-S-OFDM signals are generated. Therefore, the transmission apparatus illustrated in FIG. 8 is capable of operating switchably in two access modes, that is, a contiguous DFT-S-OFDM mode and a clustered DFT-S-OFDM mode. The transmission power control units 6-1 to 6-3 are capable of controlling transmission power individually for each CC. Note that each block is given a number in a range from 1 to 3 following a hyphen for convenience in describing communication using three CCs. An RF (Radio Frequency) unit 7 combines signals and up-converts the combined signals to a carrier frequency band. A control unit 8 controls transmission power control units 6-1 to 6-3. The transmission power control units control power according to one of methods described below.

The methods of controlling transmission power by the transmission power control units 6-1 to 6-3 are described below. Transmission power $P_{PUSCH,c}(i)$ of PUSCH (Physical Uplink Shared Channel which is a so-called physical channel for transmitting data) transmitted for each CC is given by formula (1). Note that the transmission power given by formula (1) is for a case where only PUSCH is transmitted in uplink (NPL 1).

[Formula 1]

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{array} \right\} \quad (1)$$

A function min returns a minimum element of arguments. Here, $P_{CMAX,c}(i)$ is maximum transmission power assignable by the mobile station to a c-th CC, c is a CC index, i is a subframe number of a subframe that transmits PUSCH to be controlled, $M_{PUSCH,c}(i)$ is a number of RBs in PUSCH. Furthermore, j has a different value depending on a scheduling method of a radio resource of PUSCH used by the mobile station, and more specifically, j=0 in a case where semi-persistent scheduling is used in which a radio resource is assigned periodically, while j=1 in a case where dynamic scheduling is used in which a radio resource is dynamically assigned. On the other hand, j=2 when used to transmit a random access preamble (a signal that is transmitted at first from a mobile station to a base station to establish a connection between the base station and the mobile station). $P_{O\_PUSCH,c}(i)$ prescribes minimum power necessary in a reception apparatus, and is determined by the sum of $P_{O\_NOMINAL\_PUSCH,c}(j)$ notified from the base station and $P_{O\_UE\_PUSCH,c}$.

$\alpha_c(j)$ is a value notified from the base station to the mobile station. When j=0 or j=1, one value is selected from {0, 0.4, 0.5, 0.6, 0.7, 0.8, 0.9, 1}, while when j=2, 1 is given. $PL_c$ is a value of a transmission path loss (path loss) (which is also called a coupling loss and which may be a loss taking into account an antenna gain and the like) which is estimated by the mobile station using a reference signal transmitted in downlink and which is expressed in units of dB. $\Delta_{TF,c}(i)$ is a value determined by a modulation method or a coding method used by the mobile station. $f_c(i)$ indicates that transmission power is controlled by a closed loop, and $f_c(i)$ is a TPC command notified from the base station (a control value of transmission power transmitted from the base station) used in transmission power control by the closed loop.

The value calculated by formula (1) gives transmission power that allows the base station to achieve a particular reception level when the mobile station transmits PUSCH using CCs specified by c. If this transmission power is less than maximum transmission power $P_{CMAX,c}(i)$ of PUSCH allowable in the mobile station, then the transmission is performed using this transmission power. If the above-described transmission power is larger than $P_{CMAX,c}(i)$, then the transmission is performed using $P_{CMAX,c}(i)$ as the transmission power.

CITATION LIST

Non Patent Literature

NPL 1: 3GPP TS 36.213 V10.5.0 Chapter 5.1

SUMMARY OF INVENTION

Technical Problem

In a case where transmission power control is performed for a plurality of CCs in CA, the transmission power control is performed independently for each CC, and thus an increase occurs in control data (such as TPC command or the like) associated with transmission power control between transmission and reception apparatuses. As a result, there is a possibility that a reduction in throughput occurs.

In view of the above, it is an object of the present invention to provide a wireless communication apparatus, a wireless communication method, a program, and an integrated circuit capable of reducing the amount of control data associated with transmission power control between a transmitter and a receiver when transmission power control is performed for a plurality of CCs in CA.

Solution to Problem (1) To achieve the above purpose, the present invention provides techniques described below. That is, the present invention provides a wireless communication apparatus configured to perform communication using at least two or more types of component carriers, including a transmission power control unit configured to select one calculation formula from a plurality of different calculation formulas depending on a type of the component carrier and calculate transmission power of the component carrier, a communication unit configured to perform communication using the component carrier based on the calculated transmission power.

As described above, one calculation formula is selected from the plurality of different calculation formulas depending on the type of the component carrier, and the transmission power for the component carrier is calculated. Thus, in controlling the transmission power individually for a plurality of component carriers, it is possible to reduce the amount of control data associated with transmission power control between the transmitter and receiver by using a calculation formula that allows a reduction in information associated with the transmission power control of part of component carriers.

(2) The present invention also provides a wireless communication apparatus configured to perform communication simultaneously using at least two or more types of component carriers, including a transmission power control unit configured, for each component carrier, to select one calculation formula from a plurality of different calculation formulas depending on a type of the component carrier and calculate transmission power of the component carrier, and a communication unit configured to perform communication simultaneously using two or more component carriers based on the calculated transmission power.

As described above, for each component carrier, one calculation formula is selected from the plurality of different calculation formulas depending on the type of the component carrier, and transmission power of the component carrier is calculated, and then communication is performed simultaneously using two or more component carriers based on the calculated transmission power. Thus, in controlling the transmission power individually for a plurality of component carriers in carrier aggregation, it is possible to reduce the amount of control data associated with transmission power control between the transmitter and receiver by using a calculation formula that allows a reduction in information associated with the transmission power control of part of component carriers.

(3) In the wireless communication apparatus according to the present invention, the types of component carriers include at least the following two types: CCT (Conventional Carrier Type); and NCT (New Carrier Type).

As described above, because the types of component carriers include the two types, that is, CCT (Conventional Carrier Type) and NCT (New Carrier Type), it is possible to realize higher-efficiency system by discarding the compatibility with conventional systems.

(4) The present invention also provides a wireless communication apparatus configured to perform communication using a component carrier, including a transmission power control unit configured to select one calculation formula from a plurality of different calculation formulas depending on a type of an access method used in data transmission with the component carrier and calculate transmission power of the component carrier, and a communication unit configured to perform communication using the component carrier based on the calculated transmission power.

As described above, one calculation formula is selected from a plurality of different calculation formulas depending on the type of the access method used in data transmission with the component carrier, and the transmission power for the component carrier is calculated, and thus it is possible to control the transmission power properly depending on the access method.

(5) The present invention also provides a wireless communication apparatus configured to perform communication simultaneously using at least two or more component carriers, including a transmission power control unit configured, for each component carrier, to select one calculation formula from a plurality of different calculation formulas depending on a type of an access method used in data transmission with the component carrier and calculate transmission power of the component carrier, and a communication unit configured to perform communication simultaneously using two or more component carriers based on the calculated transmission power.

As described above, one calculation formula is selected from the plurality of different calculation formulas depending on the type of the access method used in data transmission with the component carrier, transmission power for the component carrier is calculated, and communication is performed simultaneously using two or more component carriers based on the calculated transmission power. Thus, it is possible to control the transmission power properly depending on the access method in the carrier aggregation.

(6) In the wireless communication apparatus according to the present invention, the types of access methods used in the data transmission include at least OFDM (Orthogonal Frequency Division Multiplexing) and DFT-S-OFDM (Discrete Fourier Transform Spread Orthogonal Frequency Division Multiplexing).

Because the types of access methods used in the data transmission include at least OFDM (Orthogonal Frequency Division Multiplexing) and DFT-S-OFDM (Discrete Fourier Transform Spread Orthogonal Frequency Division Multiplexing) as described above, it is possible to properly select the access method depending on the transmission method, the modulation method, the positional relationship with a cell edge or the like.

(7) In the wireless communication apparatus according to the present invention, the plurality of different calculation formulas include a calculation formula that returns a constant value as the transmission power and a calculation formula that returns a variable value as the transmission power.

Because the plurality of different calculation formulas include a calculation formula that returns a constant value as the transmission power and a calculation formula that returns a variable value as the transmission power as described above, it is not necessary to measure a path loss for the NCT, and thus it becomes unnecessary to perform complicated transmission power control. Furthermore, because it becomes unnecessary to use TPC commands, it becomes possible to reduce the control data.

(8) In the wireless communication apparatus according to the present invention, the plurality of different calculation formulas include a calculation formula depending on an estimated value of a path loss between the wireless communication apparatus and a communication partner and a calculation formula not depending on the estimated value of the path loss.

Because the plurality of different calculation formulas include the calculation formula depending on the estimated value of the path loss between the wireless communication apparatus and the communication partner and the calculation formula not depending on the estimated value of the path loss as described above, it is not necessary to measure the path loss, and thus it becomes unnecessary to perform complicated transmission power control.

(9) In the wireless communication apparatus according to the present invention, the plurality of different calculation formulas include a calculation formula depending on control data of transmission power notified from a communication partner and a calculation formula not depending on the control data.

Because the plurality of different calculation formulas include the calculation formula depending on the control data of the transmission power notified from the communication partner and the calculation formula not depending on the control data as described above, it becomes possible to reduce the amount of control data.

(10) In the wireless communication apparatus according to the present invention, in a case where at first transmission, the transmission power control unit selects a particular calculation formula from the plurality of different calculation formulas, then at retransmission, the transmission power control unit selects one calculation formula different from that selected at the first transmission.

Because in the case where at first transmission, a particular calculation formula is selected from the plurality of different calculation formulas, then at retransmission, one calculation formula different from that selected at the first transmission is selected, it becomes possible to reduce the amount of control data.

(11) The present invention further provides a wireless communication method for performing communication simultaneously using at least two or more types of component carriers, including at least the steps of, for each component carrier, selecting one calculation formula from a plurality of different calculation formulas depending on a type of the component carrier and calculating transmission power of the component carrier, and performing communication simultaneously using two or more component carriers based on the calculated transmission power.

As described above, for each component carrier, one calculation formula is selected from the plurality of different calculation formulas depending on the type of the component carrier, transmission power of the component carrier is calculated, and communication is performed simultaneously using two or more component carriers based on the calculated transmission power, and thus in controlling the transmission power individually for a plurality of component carriers in carrier aggregation, it is possible to reduce the amount of control data associated with transmission power control between the transmitter and the receiver by using a calculation formula that allows a reduction in information associated with the transmission power control of part of component carriers.

(12) The present invention also provides a program configured to cause a computer to execute a sequence of processes associated with a wireless communication apparatus that performs communication simultaneously using two or more component carriers, the sequence of processes including, for each component carrier, selecting one calculation formula from a plurality of different calculation formulas depending on a type of the component carrier and calculating transmission power of the component carrier, and a process of performing communication simultaneously using two or more component carriers based on the calculated transmission power.

As described above, for each component carrier, one calculation formula is selected from the plurality of different calculation formulas depending on the type of the component carrier, transmission power of the component carrier is calculated, and communication is performed simultaneously using two or more component carriers based on the calculated transmission power, and thus in controlling the transmission power individually for a plurality of component carriers in carrier aggregation, it is possible to reduce the amount of control data associated with transmission power control between the a transmitter and a receiver by using a calculation formula that allows a reduction in information associated with the transmission power control of part of component carriers.

(13) The present invention further provides an integrated circuit disposed in a wireless communication apparatus configured to perform communication simultaneously using at least two or more types of component carriers, the integrated circuit enabling the wireless communication apparatus to have a plurality of functions including, for each component carrier, selecting one calculation formula from a plurality of different calculation formulas depending on a type of the component carrier and calculating transmission power of the component carrier, and performing communication simultaneously using two or more component carriers based on the calculated transmission power.

As described above, for each component carrier, one calculation formula is selected from the plurality of different calculation formulas depending on the type of the component carrier, transmission power of the component carrier is calculated, and communication is performed simultaneously using two or more component carriers based on the calculated transmission power, and thus in controlling the transmission power individually for a plurality of component carriers in carrier aggregation, it is possible to reduce the amount of control data associated with transmission power control between the transmitter and the receiver by using a calculation formula that allows a reduction in information associated with the transmission power control of part of component carriers.

Advantageous Effects of Invention

According to the present invention, in a case where transmission power is controlled individually for a plurality of CCs in CA, it is possible to reduce the amount of control data associated with transmission power control between a transmitter and receiver by reducing information associated with transmission power control on part of CCs.

DESCRIPTION OF EMBODIMENTS

Embodiments of the present invention are described below with reference to drawings. The present invention is described below for a case where data is transmitted using an uplink from a mobile station to a base station, however, as a matter of course, the present invention is also applicable to a case where data is transmitted using a downlink from a base station to a mobile station.

Figure 1:
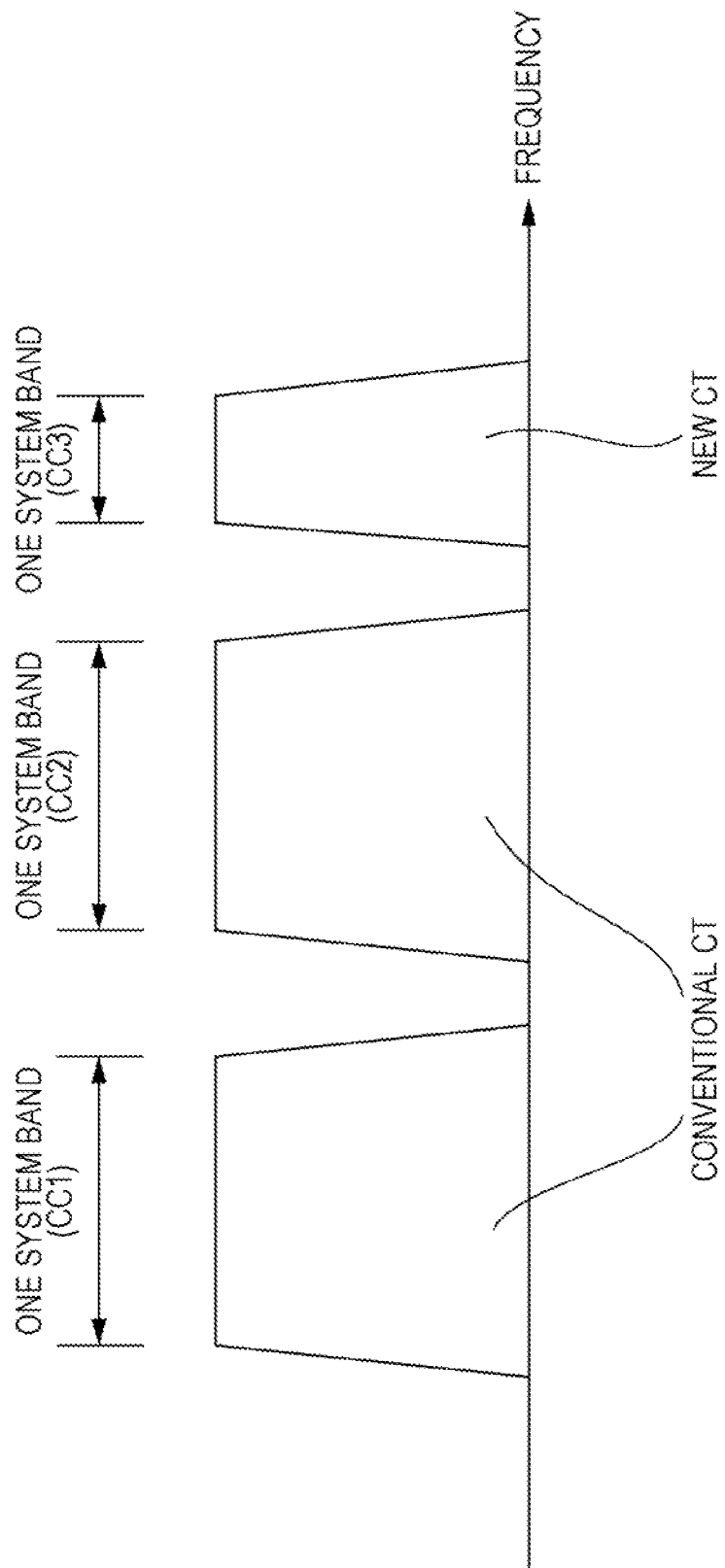
FIG. 1 is a diagram illustrating CA.

First, CA is described. FIG. 1 is a diagram illustrating CA. FIG. 1 illustrates a case where three system bands are used in CA. Although a guard band is shown between system bands, the guard band is not necessarily needed. Moreover, a guard band used may be wider than a system band. Furthermore, the system bandwidths do not need to be equal as illustrated in FIG. 1, although the system bandwidths may be equal as the matter of course. In the embodiments described below, one system band in CA is referred to as CC, and a frequency used by one CC is referred to as a system frequency.

In FIG. 1, CC1 and CC2 are referred to as being of conventional carrier type (CCT), which are each a system band compatible with a conventional system. CC3 is referred to as being of new carrier type (NCT), which is a system band incompatible with the conventional system. A reason why CC incompatible with the conventional system is employed is that a system with a higher efficiency is realized by giving up the compatibility with the conventional system. In the following description of the present invention, it is assumed that a plurality of CCs including a plurality of different types of CCs are accessed at the same time. However, the present invention also includes, in its scope, a case where CCs accessed vary depending on time. In the following description, it is assumed unless otherwise stated that DFT-S-OFDM is used for CCT and OFDM is used for NCT (OFDM is different from DFT-S-OFDM in that am OFDM signal is generated without performing DFT spreading). However, the present invention is effective for systems in which a plurality of CCs are used, and the present invention may be embodied differently.

(First Embodiment)

Figure 2:
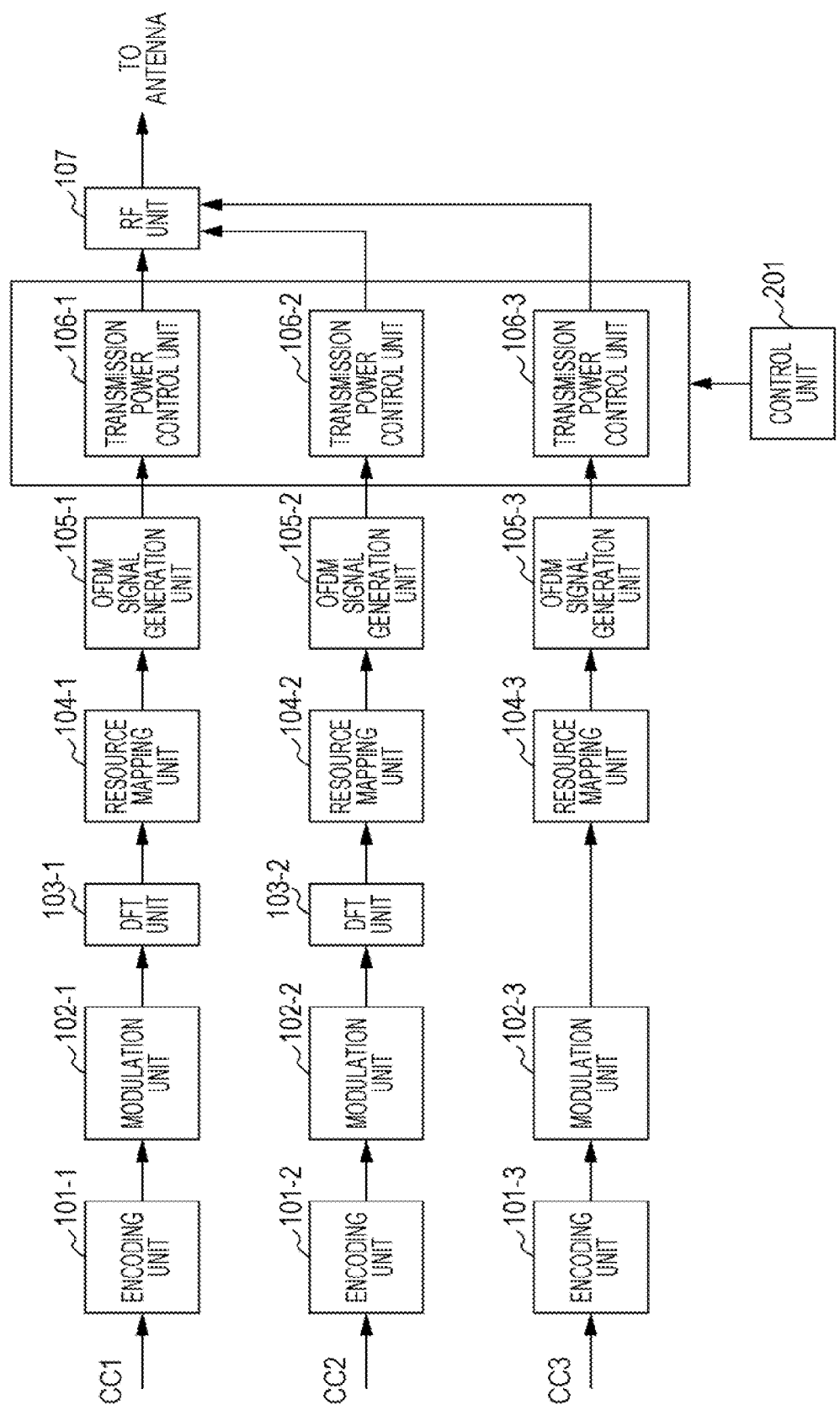
FIG. 2 is a block diagram of a transmission apparatus according to a first embodiment of the present invention for a case where the CA illustrated in FIG. 1 is performed, that is, it is assumed that there are CCT and NCT as types of CCs.

FIG. 2 is a block diagram of a transmission apparatus (wireless communication apparatus) according to a first embodiment of the present invention for a case where the CA illustrated in FIG. 1 is performed, that is, it is assumed that there are CCT and NCT as types of CCs. Note that only blocks necessary for describing the present invention are shown in FIG. 2. Encoders 101-1 to 101-3 performs error correction encoding on data. Modulation units 102-1 to 102-3 performs modulation such as QPSK or the like. DFT units 103-1 to 103-2 perform DFT on a plurality of pieces of data. Resource mapping units 104-1 to 104-3 allocates data to RBs to be used. However, in the configuration of the present transmission apparatus, there is no DFT unit in a lowest block column. This is because in CC3 it is assumed that OFDM is used.

In a case where RBs allocated by resource mapping units in upper two column blocks are contiguous, OFDM signal generation units 105-1 to 105-3 generate contiguous DFT-S-OFDM signals. However, in a case where the RBs allocated are not contiguous, the OFDM signal generation units 105-1 to 105-3 generate clustered DFT-S-OFDM signals. Thus, the transmission apparatus illustrated in FIG. 2 is capable of operating switchably in two access modes, that is, a contiguous DFT-S-OFDM mode and a clustered DFT-S-OFDM mode.

Transmission power control units 106-1 to 106-3 according to the present embodiment are capable of controlling transmission power for each system band. However, the transmission power control units 106-1 to 106-3 may be disposed in front of an IDFT unit (inverse DFT unit, not illustrated) in the OFDM signal generation units 105-1 to 105-3 and power may be changed for each subcarrier. Note that each block is given a number in a range from 1 to 3 following a hyphen because it is assumed that three system bands are used in CA in FIG. 1. An RF unit 107 combines three signals and up-converts the resultant signal to a carrier frequency band. A control unit 201 controls the transmission power control units 106-1 to 106-3. The transmission power control units 106-1 to 106-3 specify one of methods described below by which to control power. Note that one RF unit 107 may be disposed for each CC. In this case, it becomes possible to perform the transmission power control in each RF unit 107, and thus it becomes possible to control transmission power in a more flexible manner.

TPC formulas according to the present embodiment are described below. In the present embodiment, it is assumed that TPC formulas for CCT are also used for NCT. In a case where there is a transmission power control formula for NCT, as a matter of course, the formula for NCT is used. Furthermore, even when the formula for NCT is different from that for COT, this case also falls in the scope of the present invention. In the formulas used in TPC according to the present embodiment, for simplicity, a coefficient $\alpha_c$ of $PL_c$ and a term $\Delta_{TF,c}$ are omitted. Note that formulas may include the coefficient $\alpha_c$ of $PL_c$ and/or the term $\Delta_{TF,c}$. In this case, the formulas fall in the scope of the present invention. In the following description, by way of example, only PUSCH is transmitted. TPC for CCT is performed according to formula (2) (transmission power after TPC for CCT is performed is denoted by $\hat{P}_{PUSCH,c}$ hat).

[Formula 2]

$$\hat{P}_{PUSCH,c} = \min\left\{\begin{array}{c} P_{CMAX,c}, \\ 10\log_{10}(M_{PUSCH,c}) + P_{O\_PUSCH,c} + PL_c + f_c \end{array}\right\} \quad (2)$$

In formula (2), only terms necessary for describing the present invention are shown. In formula (2), $P_{CMAX,c}$ is maximum transmission power of CC. $M_{PUSCH,c}$ is the number of RBs used, and thus it is implied that the transmission power increases in proportion to the number of RBs used. $P_{O\_PUSCH,c}$ is nominal target reception power set for each mobile station apparatus. $PL_c$ is a value determined by the path loss. $f_c$ is a parameter (also referred to as a TPC command) that determines a control value of transmission power control by the closed loop. The TPC command in $f_c$ used in the transmission power control by the closed loop is notified from a receiving apparatus in communication. A subscript c is a CC index. Next, TPC for NCT is performed according to formula (3) (transmission power after TPC for NCT is performed is denoted by $P_{PUSCH,c}$)

[Formula 3]

$$P_{PUSCH,c} = A_c \quad (3)$$

That is, transmission power is constant, and thus it is not necessary to measure the path loss for NCT, and it becomes unnecessary to perform complicated transmission power control. Furthermore, the TPC command becomes unnecessary, and thus it is possible to make a contribution to a reduction in amount of control data. Ideas of using NCT have been proposed. One of them is to use NCT in connecting a Low Power Node (LPN). LPN refers to a base station having a service area smaller than that of usual base stations. In the connection to such an LPN, large transmission power is not necessary by nature. Thus even if the transmission power is not controlled depending on the path loss, no significant influence on other cells occurs. Therefore, when the transmission power is set to be constant as described above, no significant influence on the total system occurs. In formula (3), the value of $A_c$ is allowed to be set individually for each CC. For NCT, the value of $A_c$ may be set to be constant. Alternatively, TPC for NCT may be performed according to formula (4).

[Formula 4]

$$P_{PUSCH,c} = \min\left\{\begin{array}{c} P_{CMAX,c}, \\ 10\log_{10}(M_{PUSCH,c}) + P_{O\_PUSCH,c} + B_c \end{array}\right\} \quad (4)$$

In comparison with formula (2) used in TPC for CCT, formula (4) does not include terms associated with the path loss and the TPC command. This makes it unnecessary, as with formula (3), to measure the path loss. Furthermore, the TPC command becomes unnecessary. Thus, it becomes possible to reduce the amount of control data. Moreover, in formula (4), transmission power per subcarrier (referred to as transmission power density) is constant. $B_c$ may be varied depending on a number uniquely assigned to a mobile station. In a simple case in which the number takes a value in a range from 1 to 10, the value of $B_c$ may be changed depending on whether or not the number uniquely assigned to the mobile station is equal to or less than 5. This setting is useful in a case where a reception method employed provides a better characteristic when there is a different in reception power. More specifically, this may occur in a case where frequency resources are shared by a plurality of mobile stations, and data is demodulated by the receiver by performing an iterative process. That is, if a signal can be received by a mobile station having high reception sensitivity, then interference thereof can be removed by producing a replica of the received signal. Furthermore, in the TPC, the constant value may be changed depending on a condition.

[Formula 5]

$$P_{PUSCH,c} = \left\{\begin{array}{l} D_c \ldots \lambda \\ E_c \ldots non-\lambda \end{array}\right\} \quad (5)$$

This formula returns $D_c$ as the transmission power for a certain condition $\lambda$ but returns $E_c$ as the transmission power for any condition other than $\lambda$. For example, if $\lambda$ is defined as first transmission, the transmission power is set to $D_c$ when first transmission is performed, and the transmission power is set to $E_c$ when retransmission is performed. This also allows it to achieve the effects described above and achieve an improvement in communication quality in retransmission.

Figure 3:
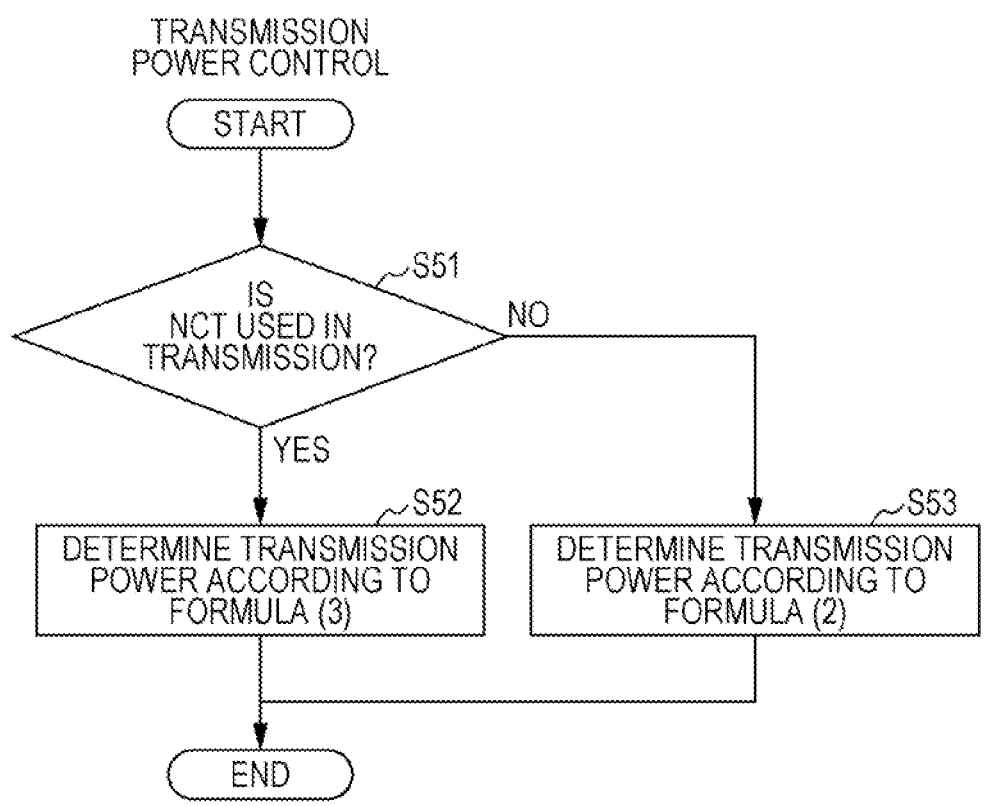
FIG. 3 is a flow chart illustrating a control flow for a case where transmission power is controlled using formula (3) according to a first embodiment of the present invention.

FIG. 3 is a flow chart illustrating a control flow for a case where transmission power is controlled using formula (3) according to the first embodiment of the present invention. In step S51, a judgment is made as to whether the signal for which to control the transmission power is a signal to be transmitted using CC of NCT or a signal to be transmitted using CC of CCT. In a case where the signal for which to control the transmission power is a signal to be transmitted using CC of NCT (YES in S51), the transmission power is determined using formula (3) (step S52). In a case where the signal for which to control the transmission power is a signal to be transmitted using CC of CCT (NO in S51), the transmission power is determined using formula (2) (step S53). Note that also in a case where formula (4), which is one of examples of transmission power control formulas for NCT according to the first embodiment, is used, the transmission power is controlled according to a flow chart similar to that illustrated in FIG. 3.

Figure 4:
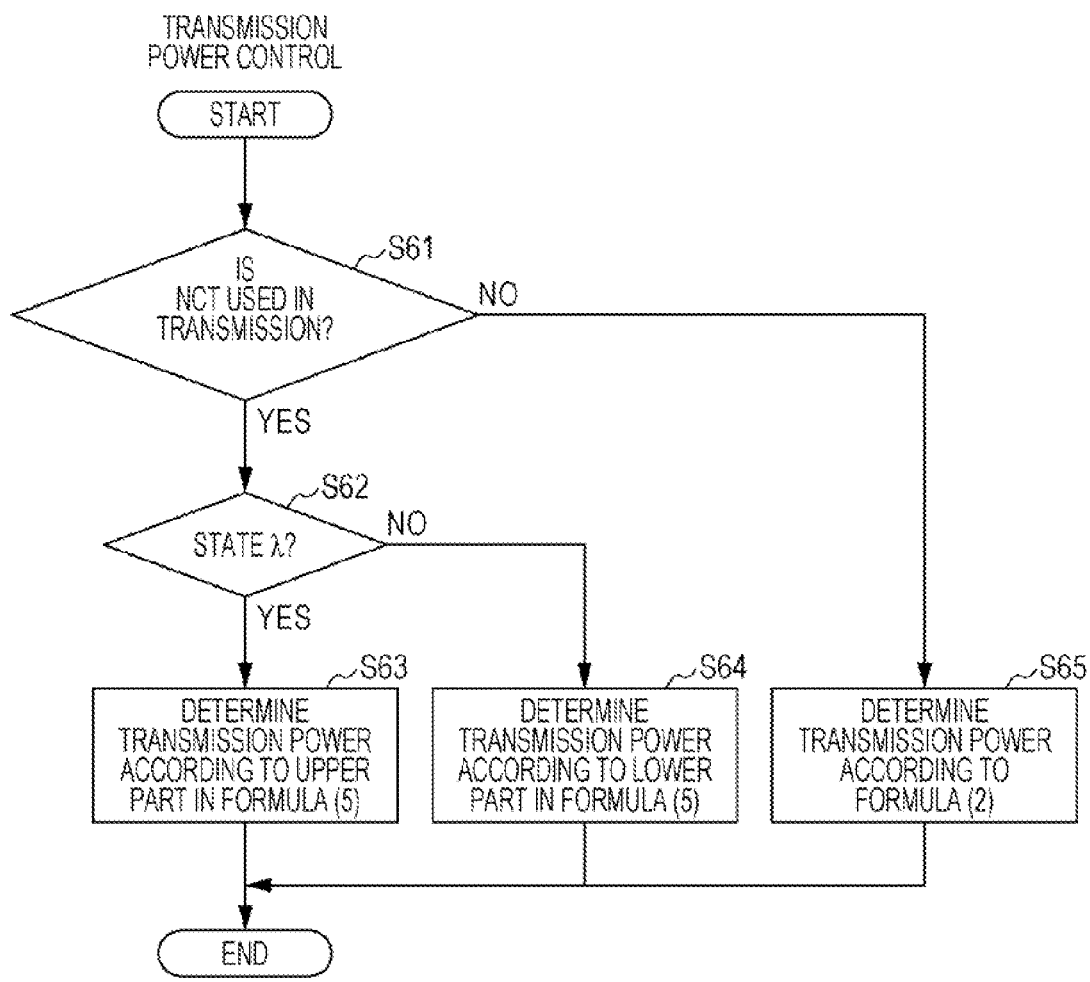
FIG. 4 is a flow chart illustrating a control flow for a case where transmission power is controlled using formula (5) according to a first embodiment of the present invention.

FIG. 4 is a flow chart illustrating a control flow for a case where transmission power is controlled using formula (5) according to the first embodiment of the present invention. First, a judgment is made as to whether the signal for which to control the transmission power is a signal to be transmitted using CC of NCT or a signal to be transmitted using CC of CCT (step S61). In a case where the signal for which to control the transmission power is a signal to be transmitted using CC of NCT (YES in step S61), a further determination is made as to whether the condition is X or not X (step S62). In a case where the condition is X (YES in step S62), the transmission power is determined using an upper part of the right side of formula (5) (step S63). In a case where the condition is not X (NO in step S62), the transmission power is determined using a lower part of the right side of formula (5) (step S64). In a case where the signal for which to control the transmission power is a signal to be transmitted using CC of CCT (NO in step S61), the transmission power is determined using formula (2) (step S65).

(Second Embodiment)

In the first embodiment described above, there is a difference between a factor used in calculation of the transmission power for CCT and a factor used in calculation of the transmission power for NCT. A second embodiment described below discloses a method of changing the maximum transmission power for each case. Note that in the present embodiment, the maximum transmission power refers to an upper limit of the transmission power set for each CC. TPC formulas according to the present embodiment are described below. In the present embodiment, as in the first embodiment, it is assumed that there are CCT and NCT as types of CCs. It is assumed that TPC formulas for CCT are also used for NOT. In a case where there is a transmission power control formula for NCT, as a matter of course, the formula for NCT is used. Furthermore, even when the formula for NCT is different from that for CCT, this case also falls in the scope of the present invention. In the formulas used in TPC according to the present embodiment, for simplicity, a coefficient $\alpha_c$ of $PL_c$ and a term $\Delta_{TF,c}$ are omitted. Note that formulas may include the coefficient $\alpha_c$ of $PL_c$ and/or the term $A_{TF,c}$. In this case, the formulas fall in the scope of the present invention. In the following description, by way of example, only PUSCH is transmitted. As in the first embodiment, TPC for CCT is performed according to formula (2) (transmission power after TPC for CCT is performed is denoted by $P_{PUSCH,c}$ hat).

[Formula 6]

$$\hat{P}_{PUSCH,c} = \min\left\{\begin{array}{l} P_{CMAX,c}, \\ 10\log_{10}(M_{PUSCH,c}) + P_{O\_PUSCH,c} + PL_c + f_c \end{array}\right\} \quad (2)$$

On the other hand, TPC for NCT is performed according to formula (6) (transmission power after TPC for NCT is performed is denoted by $P_{PUSCH,c}$)

[Formula 7]

$$P_{PUSCH,c} = \min\left\{\begin{array}{l} P_{CMAX,c} - F, \\ 10\log_{10}(M_{PUSCH,c}) + P_{O\_PUSCH,c} + PL_c + f_c \end{array}\right\} \quad (6)$$

Here, if F is set to be constant, it is not necessary to newly notify of control data. By determining the transmission power in the manner described above, it is possible to suppress the maximum transmission power for NCT, which makes it possible to set the substantial service range to be small. In formula (6), the lower part is for a case where the maximum transmission power is not achieved, and this is the same as that in formula (2). However, as a matter of course, the lower part in formula (4) may be alternatively used. Alternatively, the setting may be performed as described below.

[Formula 8]

$$P_{PUSCH,c} = \min\left\{\begin{array}{l} G_c, \\ 10\log_{10}(M_{PUSCH,c}) + P_{O\_PUSCH,c} + PL_c + f_c \end{array}\right\} \quad (7)$$

In this case, if $G_c$ for NCT is set to be equal in advance, it becomes unnecessary to transmit unneeded control data, and it becomes possible to set the maximum transmission power for NCT to be low. Furthermore, in a case where transmission is performed by simultaneously using a plurality of CCs, to allow it to give priority to transmission of CCT, the maximum value may be set as follows.

[Formula 9]

$$P_{PUSCH,c} = \min\left\{\begin{array}{l} 10\log_{10}\left(10^{\frac{P_{CMAX,c}}{10}} - \sum_{c \in CCT} 10^{\frac{\hat{P}_{PUSCH,c}}{10}}\right), \\ 10\log_{10}(M_{PUSCH,c}) + P_{O\_PUSCH,c} + PL_c + f_c \end{array}\right\} \quad (8)$$

In formula (8), a term including $\Sigma$ in the upper part represents the total transmission power, in units of mW, of data transmitted by CCT. This setting allows it to give priority to transmission of data by CCT.

Figure 5:
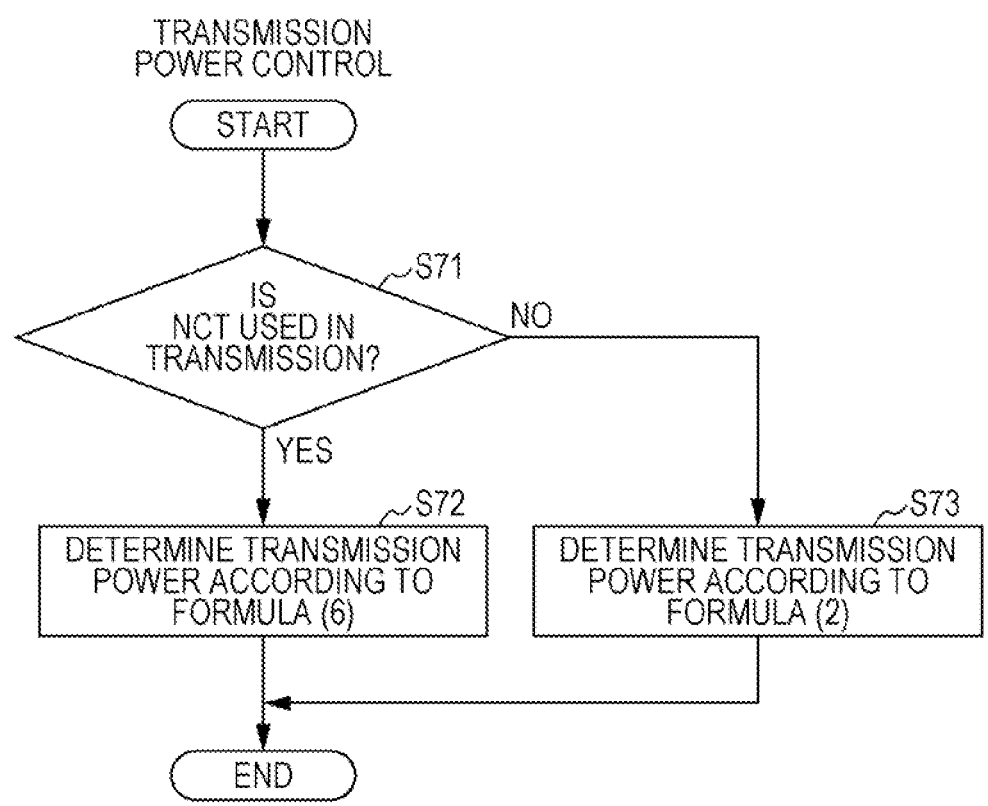
FIG. 5 is a flow chart illustrating a control flow for a case where transmission power is controlled using formula (6) according to a second embodiment of the present invention.

FIG. 5 is a flow chart illustrating a control flow for a case where transmission power is controlled using formula (6) according to the second embodiment of the present invention. First, a judgment is made as to whether the signal for which to control the transmission power is a signal to be transmitted using CC of NCT or a signal to be transmitted using CC of CCT (step S71). In a case where the signal for which to control the transmission power is a signal to be transmitted using CC of NCT (YES in step S71), the transmission power is determined using formula (6) (step S72). In a case where the signal for which to control the transmission power is a signal to be transmitted using CC of CCT (NO in step S71), the transmission power is determined using formula (2) (step S73). Note that also in a case where formula (7) or formula (8), which are transmission power control formulas for NCT according to the second, are used, the transmission power is controlled according to a flow chart similar to that illustrated in FIG. 5.

Third Embodiment

In the first and second embodiments described above, the manner of controlling transmission power does not depend on the type of access method used for NCT. In a third embodiment described below, it is assumed that a plurality of access methods are used. Note that the third embodiment disclosed herein is also applicable to a case in which a plurality of access methods are used for CCT and a case where in which a plurality of access methods are used for both CCT and NCT. Here, it is assumed that two access methods are used. More specifically, it is assumed that one of the two access methods is OFDM and the other one is DFT-S-OFDM (here, DFT-S-OFDM refers to Contiguous DFT-S-OFDM and Clustered DFT-S-OFDM). These two methods have features that OFDM is suitable for use in MIMO transmission, multilevel modulation, or the like, while DFT-S-OFDM has a good characteristics in terms of PAPR (the ratio between the maximum transmission power and the average transmission power), that is, DFT-S-OFDM provides a low PAPR, which provides a merit that an amplifier can be used efficiently and thus DFT-S-OFDM is suitable for use in transmission from a cell edge.

Figure 6:
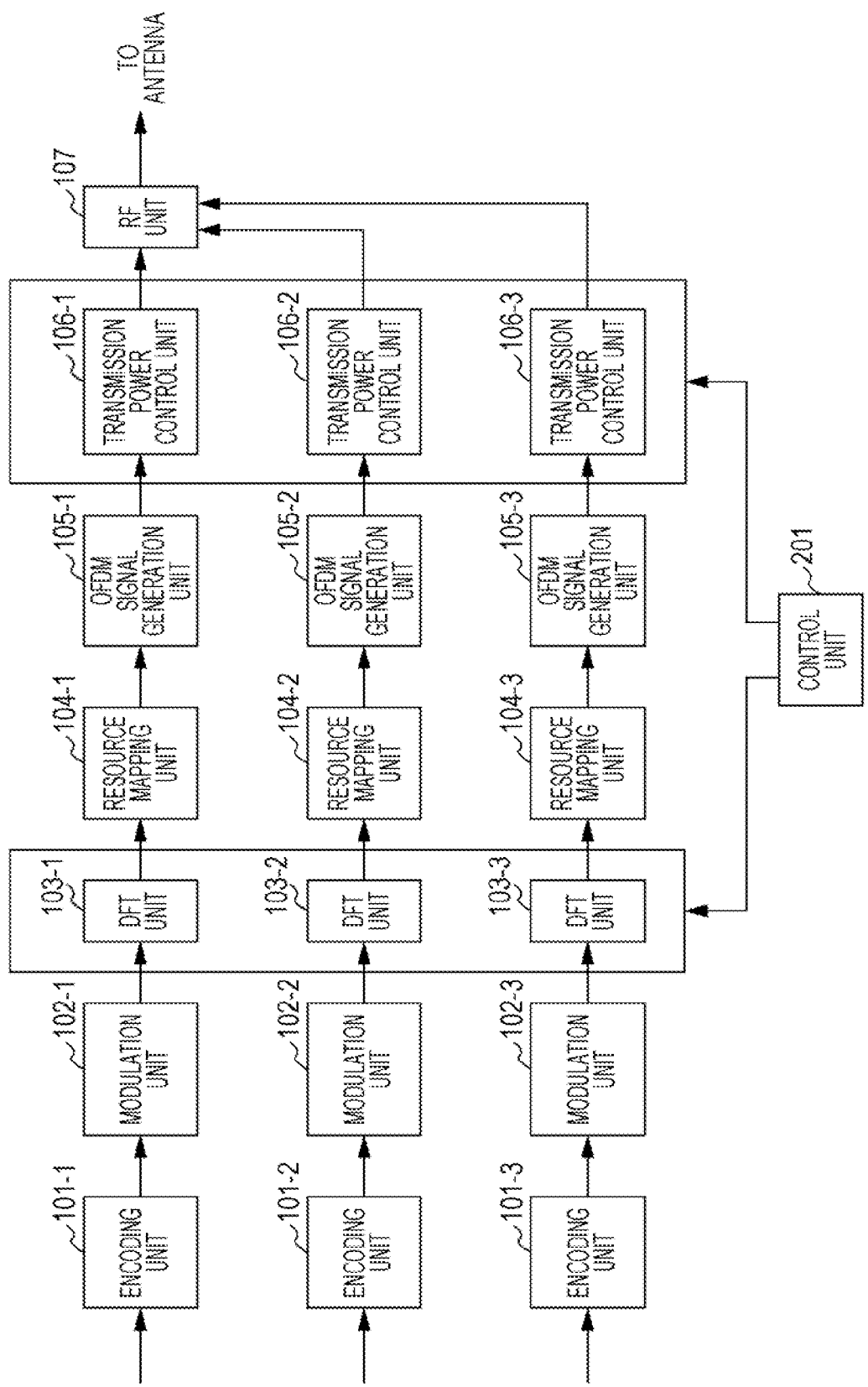
FIG. 6 is a block diagram of a transmission apparatus according to a third embodiment of the present invention.

FIG. 6 is a block diagram of a transmission apparatus according to the third embodiment of the present invention. Herein, it is assumed that CCs are configured in a similar manner to that illustrated in FIG. 1. In the first and second embodiments, it is assumed that CC1 and CC2 are of CCT and CC3 is of NCT. However, in the present embodiment, it is assumed that all CCs are of NCT. FIG. 6 is similar to FIG. 1 except that the block diagram of the transmission apparatus illustrated in FIG. 6 includes an additional block of DFT unit in a part corresponding to CC3, and that the control unit 201 also controls the DFT units. Basically, each block has a function similar to that of the corresponding block illustrated in FIG. 2. However, the DFT units in FIG. 6 do not perform the DFT operation when OFDM transmission is performed. The control unit 201 controls whether the DFT units perform the operation or not.

TPC formulas according to the present embodiment are described below. In the formulas according to the present embodiment, for simplicity, a coefficient $\alpha_c$ of $PL_c$ and a term $\Delta_{TF,c}$ are omitted. Note that formulas may include the coefficient $\alpha_c$ of $PL_c$ and/or the term $\Delta_{TF,c}$. In this case, the formulas fall in the scope of the present invention. In the following description, by way of example, only PUSCH is transmitted. In the present embodiment, in a case where DFT-S-OFDM is selected as the transmission method, TPC is performed according to formula (2) (in the case where DFT-S-OFDM is selected as the transmission method, transmission power after TPC for CCT is performed is denoted by $P_{PUSCH,c}$ hat).

[Formula 10]

$$\hat{P}_{PUSCH,c} = \min\left\{\begin{array}{l}P_{CMAX,c},\\ 10\log_{10}(M_{PUSCH,c}) + P_{O\_PUSCH,c} + PL_c + f_c\end{array}\right\} \quad (2)$$

In a case where OFDM is selected as the transmission method, TPC is performed according to formula (9) (in the case where OFDM is selected as the transmission method, transmission power after TPC for CCT is performed is denoted by $P_{PUSCH,c}$).

[Formula 11]

$$P_{PUSCH,c} = \min\left\{\begin{array}{l}P_{CMAX,c} - H,\\ 10\log_{10}(M_{PUSCH,c}) + P_{O\_PUSCH,c} + B_c\end{array}\right\} \quad (9)$$

Here, if H is set to be constant, it is not necessary to newly notify of control data. $B_c$ may be varied depending on a number uniquely assigned to a mobile station. This setting is useful in a case where a reception method employed provides a better characteristic when there is a different in reception power.

Figure 7:
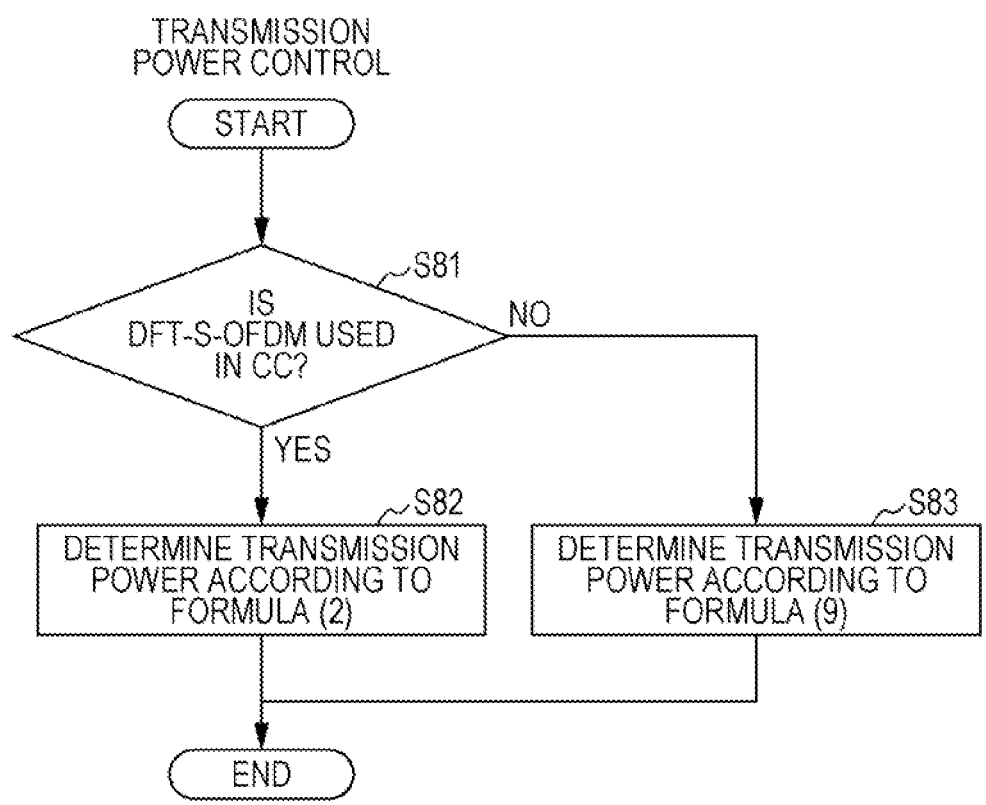
FIG. 7 is a flow chart illustrating a control flow for a case where transmission power is controlled according to a third embodiment of the present invention.
Figure 8:
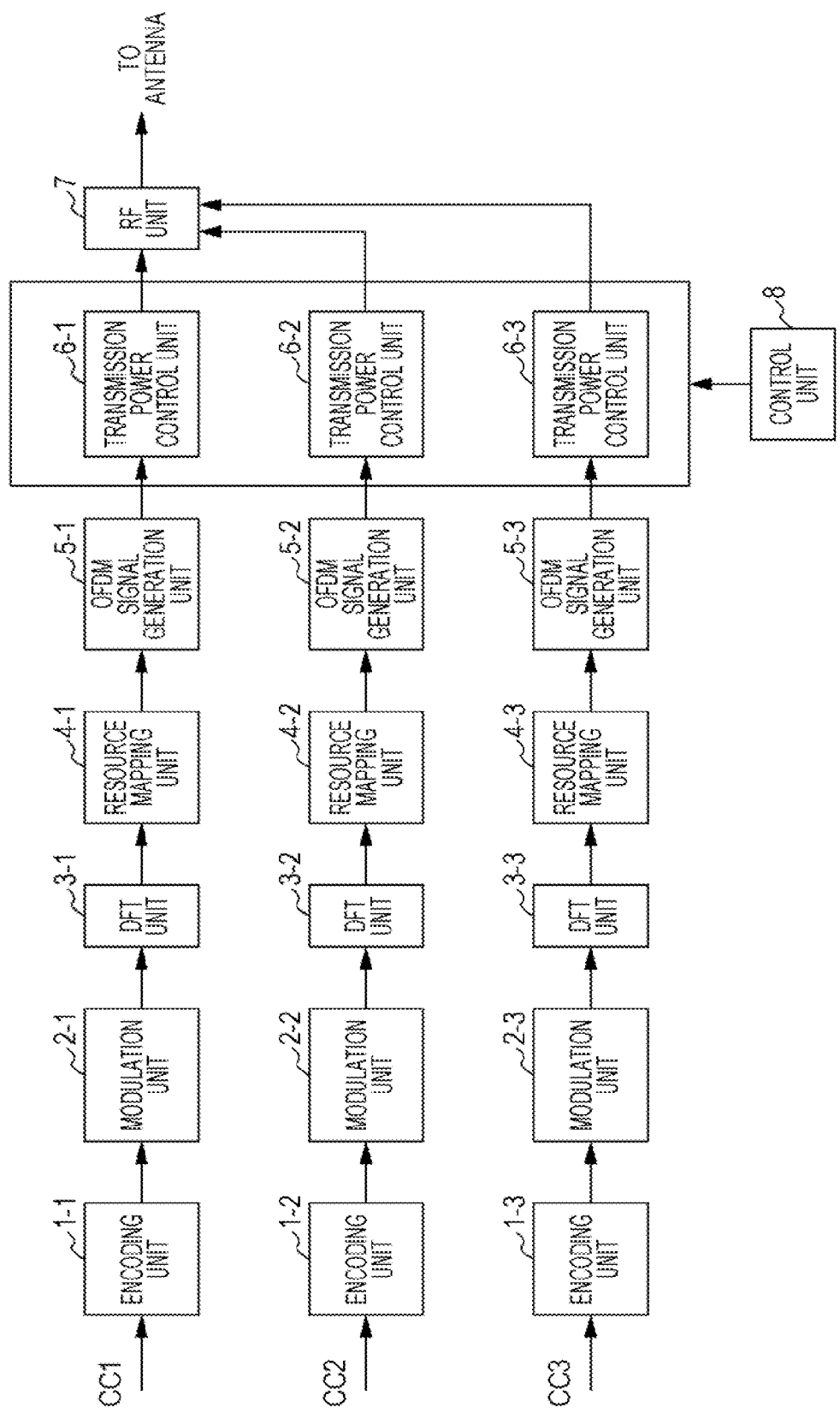
FIG. 8 is a block diagram of a transmission apparatus of a mobile station that performs transmission to a base station by using three CCs.

FIG. 7 is a flow chart illustrating a control flow for a case where transmission power is controlled according to the third embodiment of the present invention. A judgment is made as to whether the access method of CC for transmitting a signal to control transmission power is DFT-S-OFDM or is not DFT-S-OFDM (step S81). In a case where the access method of CC for transmitting the signal to control transmission power is DFT-S-OFDM (YES in step S81), the transmission power is determined using formula (2) (step S82). In a case where the access method of CC for transmitting the signal to control transmission power is not DFT-S-OFDM (NO in step S81), the transmission power is determined using formula (9) (step S83).

In the above description, it is assumed by way of example that in the case where OFDM is selected as the transmission method, TPC is performed using formula (9). Alternatively, in the case where OFDM is selected as the transmission method, as a matter of course, one of formulas (3) to (8) may be used as a TPC formula.

A program executed in the wireless communication apparatus according to the present invention is a program that controls a CPU or the like so as to realize functions of the above-described embodiments of the invention (that is, a program that causes a computer so as to has the functions). Information treated in the apparatus is temporarily stored in a RAM when the information is processed, and then stored in various types of ROMs or HDDs. The information is read out therefrom by the CPU as required and changed or rewritten. The program is stored in a storage medium, which may be any of the followings: a semiconductor medium, (for example, a ROM, a nonvolatile memory card, or the like), an optical storage medium (for example, DVD, MO, MD, CD, BD, or the like), a magnetic storage medium (for example, a magnetic tape, a flexible disk, or the like), and the like.

Not only the functions of the embodiments described above are realized by executing the loaded program, but the functions of the invention may also be realized by performing a process in cooperation with an operating system or another application program or the like according to an instruction of the program. To distribute the program in market, the program may be stored in a portable storage medium and distributed, or the program may be transferred to a server computer connected via a network such as the Internet or the like. In this case, a storage apparatus of the server computer also falls within the scope of the present invention.

Part or whole of the wireless communication apparatus according to the embodiments described above may be realized by a LSI which is a typical integrated circuit. The respective functional blocks of the wireless communication apparatus may be individually realized on separate chips, or part or all of functions may be integrated on a chip. The method of realizing the integrated circuit is not limited to the LSI, but the functions may be implemented by a dedicated circuit or general-purpose processor. If the progress of the semiconductor technology provides a technology for implementing an integrated circuit which replaces the LSI, the integrated circuit based on this technology may also be used.

REFERENCE SIGNS LIST

1-1 to 1-3 encoder
2-1 to 2-3 modulation unit
3-1 to 3-3 DFT unit
4-1 to 4-3 resource mapping unit
5-1 to 5-3 OFDM signal generation unit
6-1 to 6-3 transmission power control unit
7 RF unit
8 control unit
101-1 to 101-3 encoder
102-1 to 102-3 modulation unit
103-1 to 103-3 DFT unit
104-1 to 104-3 resource mapping unit
105-1 to 105-3 OFDM signal generation unit
106-1 to 106-3 transmission power control unit
107 RF unit
201 control unit

The invention claimed is:

1. A terminal apparatus that transmits data to a first communication apparatus and a second communication apparatus different from the first communication apparatus, the terminal apparatus comprising:

a modulation circuit configured and/or programmed to set a modulation scheme used for transmission from at least a plurality of modulation schemes;
an encoder configured and/or programmed to set a coding scheme used for transmission from a plurality of coding schemes; and
a transmission power control circuit configured and/or programmed to control transmission power,
wherein the transmission power control circuit,
sets the transmission power with a first transmission power calculation method using at least a value related to the modulation scheme used in the modulation circuit or the coding scheme used in the encoder, when transmitting data to the first communication apparatus,
selects one from a plurality of different transmission power calculation methods as a second transmission power calculation method to set the transmission power with the selected second transmission power calculation method, depending on a condition, without using the value related to the modulation scheme used in the modulation circuit or the coding scheme used in the encoder, and without using a value related to a TPC command, and sets the transmission power with the selected second transmission power calculation method, when transmitting data to the second communication apparatus, and
transmits data using the modulation scheme, the coding scheme, and the transmission power that have been set.

2. The terminal apparatus according to claim 1, wherein at least one of the plurality of different transmission power calculation methods is a constant value to be set in advance.

3. A method of a terminal apparatus that transmits data to a first communication apparatus and a second communication apparatus different from the first communication apparatus, the method comprising the steps of:
setting a modulation scheme used for transmission from at least a plurality of modulation schemes;
setting a coding scheme used for transmission from a plurality of coding schemes; and
controlling transmission power,
wherein the step of controlling transmission power,
sets the transmission power with a first transmission power calculation method using at least a value related to the modulation scheme used in the step of setting a modulation scheme or the coding scheme used in the step of setting a coding scheme, when transmitting data to the first communication apparatus,
selects one from a plurality of different transmission power calculation methods as a second transmission power calculation method to set the transmission power with the selected second transmission power calculation method, depending on a condition, without using the value related to the modulation schedule used in the step of setting modulation scheme or the coding scheme used in the step of setting a coding scheme, and without using a value related to a TPC command, and sets the transmission power with the selected second transmission power calculation method, when transmitting data to the second communication apparatus, and
transmits data using the modulation scheme, the coding scheme, and the transmission power that have been set.

4. The method according to claim 3, wherein at least one of the plurality of different transmission power calculation methods is a constant value to be set in advance.

* * * * *